(12) United States Patent
Filipenko et al.

(10) Patent No.: US 12,162,514 B2
(45) Date of Patent: Dec. 10, 2024

(54) MULTI-LAYERED APPROACH FOR PATH PLANNING AND ITS EXECUTION FOR AUTONOMOUS CARS

(71) Applicants: Constructor Technology AG, Schaffhausen (CH); Constructor Education and Research Genossenschaft, Schaffhausen (CH)

(72) Inventors: Maksim Filipenko, Batumi (GE); Aleksandr Buyval, Bremen (DE); Ruslan Mustafin, Tbilisi (GE); Ilya Shimchik, Zurich (CH); Serguei Beloussov, Singapore (SG); Stanislav Protasov, Singapore (SG); Nikolay Dobrovolskiy, Alanya (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 160 days.

(21) Appl. No.: 17/647,380

(22) Filed: Jan. 7, 2022

(65) Prior Publication Data
US 2023/0219599 A1    Jul. 13, 2023

(51) Int. Cl.
*B60W 60/00* (2020.01)
*B60W 30/18* (2012.01)
(Continued)

(52) U.S. Cl.
CPC .. *B60W 60/0011* (2020.02); *B60W 30/18163* (2013.01); *B60W 40/064* (2013.01);
(Continued)

(58) Field of Classification Search
CPC ........ B60W 60/0011; B60W 60/0015; B60W 60/0023; B60W 60/0021; B60W 40/064; B60W 2556/50; B60W 2556/60; B60W 2420/403; B60W 2420/42; B60W 2420/52; B60W 2510/0657; B60W 2510/0676; B60W 2530/16; B60W 2540/18; H04W 4/44
See application file for complete search history.

(56) References Cited

U.S. PATENT DOCUMENTS 9,632,502 B1 * 4/2017 Levinson ............... B60Q 1/507
10,696,301 B2 * 6/2020 Abe ..................... G06V 20/588
(Continued)

FOREIGN PATENT DOCUMENTS

CN          110568841 A       8/2019

OTHER PUBLICATIONS

C. Liu, S. Lee, S. Varnhagen and H. E. Tseng, "Path planning for autonomous vehicles using model predictive control," 2017 IEEE Intelligent Vehicles Symposium (IV), Los Angeles, CA, USA, 2017, pp. 174-179, doi: 10.1109/IVS.2017.7995716. (Year: 2017).*

*Primary Examiner* — Gertrude Arthur Jeanglaude
(74) *Attorney, Agent, or Firm* — ESPE Legal Consultancy FZ-LLC

(57) ABSTRACT

A multi-layer path-planning system and method calculates trajectories for autonomous vehicles using a global planner, a fast local planner, and an optimizing local planner. The calculated trajectories are used to guide the autonomous vehicle along a bounded path between a starting point and a destination.

20 Claims, 7 Drawing Sheets

(51) Int. Cl.
*B60W 40/064* (2012.01)
*H04W 4/44* (2018.01)

(52) U.S. Cl.
CPC .... *B60W 60/0015* (2020.02); *B60W 60/0021* (2020.02); *B60W 60/0023* (2020.02); *H04W 4/44* (2018.02); *B60W 2420/403* (2013.01); *B60W 2420/408* (2024.01); *B60W 2510/0657* (2013.01); *B60W 2510/0676* (2013.01); *B60W 2530/16* (2013.01); *B60W 2540/18* (2013.01); *B60W 2556/50* (2020.02)

(56) References Cited

U.S. PATENT DOCUMENTS

| | | |
|---|---|---|
| 10,860,023 B2 | 12/2020 | Di Cairano et al. |
| 10,970,746 B2 | 4/2021 | Singhal et al. |
| 2019/0185010 A1* | 6/2019 | Ganguli ............... G05D 1/0217 |
| 2019/0317512 A1* | 10/2019 | Zhang ............... B60W 60/0013 |
| 2019/0361456 A1 | 11/2019 | Zeng et al. |
| 2019/0381993 A1 | 12/2019 | Park et al. |
| 2020/0184741 A1* | 6/2020 | Tormasov ............. G06Q 50/30 |
| 2021/0048304 A1 | 2/2021 | Pedersen |
| 2021/0064042 A1 | 3/2021 | Matsuda |
| 2021/0109539 A1 | 4/2021 | Kobilarov |
| 2022/0379920 A1* | 12/2022 | Yang ................. B60W 60/0015 |

\* cited by examiner

MULTI-LAYERED APPROACH FOR PATH PLANNING AND ITS EXECUTION FOR AUTONOMOUS CARS

TECHNICAL FIELD

The invention pertains to autonomous navigation systems for motor vehicles.

BACKGROUND

The navigational path for autonomous vehicles needs to be planned and executed in a limited amount of time. For example, to make autonomous path execution reliable, the trajectory needs to be re-planned each time a car receives new sensor data. Obstacles along the path must be avoided. To optimize trip time, other vehicles along the path may need to be overtaken. Calculating and recalculating a route imposes an overhead on compute resources and slows route processing. A solution is needed that can plan and re-plan a vehicle trajectory quickly and within the handling limit of the vehicle to optimize both travel time and safety.

SUMMARY

To improve navigational timing a tripartite path-planning system is used. The first planner is a global planner. It quickly calculates an optimal time trajectory along a given route. The first planner takes into account motor curve, aerodynamics, and adhesion coefficient. Adhesion coefficient simulating wheel and rail is the ratio of the tangential friction force between wheel and rail rollers and normal force. This includes track geometry for all cars. The second planner is a fast local planner with a simplified vehicle dynamics model to accelerate the calculation of the optimal detour trajectory, restrict obstacles, and number of input parameters. The third planner is a local planner with an advanced vehicle dynamics model. This planner is always on, controls vehicle condition, and recalculates updates as quickly as every 20-30 milliseconds.

Planning is divided into several levels. The last level of planning further includes vehicle dynamics to ensure that the vehicle stays within safety limits.

The first, global planner provides a general plan of actions similar to navigator. The second, fast local planner provides simplified trajectories for avoiding obstacles or overtaking the moving objects. The third, local planner with advanced vehicle dynamics model provides reliable trajectory taking into account current state and vehicle dynamics, and guarantees that trajectory is within the limit of handling and safe for the given state In an embodiment, method for planning a safe trajectory for autonomous vehicle comprises loading the autonomous vehicle driving model to a driving path controller, reading the first set of vehicle control parameters on the driving path controller, determining a route for autonomous vehicle by the global route planner from current location to a finish based on the first set of vehicle control parameters, periodically reading the second set of vehicle control parameters on the driving path controller, determining a driving passage along the route by the driving passage planner that includes the left and right boundaries of the passage, which guarantees the minimum time to the finish and driving safety based on the second set of vehicle control parameters s using the autonomous vehicle driving model, periodically reading the third set of vehicle control parameters on the driving path controller, determining a local trajectory of vehicle relative to the driving passage based on the third set of vehicle control parameters using the autonomous car driving model, and transmitting the local trajectory to the autonomous vehicle control system.

In an embodiment, the first set of vehicle control parameters includes static autonomous vehicle control parameters. In an alternative embodiment, the second set of vehicle control parameters includes parameters defining circumstances around the autonomous vehicle. In alternative embodiment, the third set of vehicle control parameters includes parameters of autonomous vehicle environment.

In an embodiment, the period of reading the first set of vehicle control parameters is longer than the period of reading the third set of vehicle control parameters. In an alternative embodiment, the local trajectory can go beyond the boundaries of the passage if it leads to minimization of the time to finish, or to better safety or performance of the autonomous vehicle.

DETAILED DESCRIPTION

Figure 1:
FIG. 1 shows an embodiment of a global planning path.

A three-layered system is used for path planning and execution. Global path planning occurs at the first layer. The second layer implements V2X (Vehicle to Everything), where environmental conditions are transmitted to a vehicle. V2X includes, for example, vehicle to network, vehicle to vehicle, vehicle to infrastructure, vehicle to pedestrian, and so on. The third stage is a Model Predictive Control (MPC) layer.

In the first layer, global path planning is undertaken in view of a starting point and end point connected by a path. A dataset is used to generate a first map. A second, optimized map is calculated by finding minima and maxima for various functions. These minima and maxima are used to calculate optimal values, such as optimal control to minimize costs, lap time, risks, and actuation.

In the second layer, V2X is employed to identify objects that can be used for more granular planning. Data is received about all obstacles in the environment. From this data abstractions can be derived. For example, a perception subsystem interprets the data as obstacles on the road. In an embodiment, these objects are identified by lidar, camera, or from a similarly reliable system that knows the ground truth of the area. Objects can be simulated digitally and metaverse created with, for example, a virtual car on a track. The system is generated and sends the exact location of the object. Input is the position of the obstacles, collected from all available sources. In an embodiment, intervals (i) define the trajectory. The position of each object is determined and different combinations of how objects can be avoided or overtaken are generated. The system calculates a motion for the vehicle that resolves the obstacles. The intervals are an input to a graph finder algorithm. The graph finder finds the best path given the constraints. In an embodiment, metaparameters are also used as inputs for the graph-finder.

For example, the graph finder gets constraints such as cost parameters as an input. In this instance, the cost parameters are that the autonomous vehicle is a large passenger car with relatively poor aerodynamics and cornering capacity compared to a racing car on the track. This constraint affects the speed at which the vehicle may turn safely. Other constraints can be set for velocity, acceleration, or external conditions such as weather, surface friction and so on. Map data enhanced with augmented reality (AR) information is also an input for the graph finder.

The second layer's trajectory is used when there are obstacles, such as environmental objects or other cars to pass. The second layer's graph finder calculates an approximate trajectory and then sends output to the third layer's MPC solver, which calculates a new trajectory.

The focus of the third stage is the static parameters for the algorithms. Optimizations are calculated for relevant variables, such as time (t). For example, a typical calculation is the vehicle trajectory that requires the least amount of time over a given distance or path.

The three layers are iterative. A global path is calculated at the first layer. Then obstacle detection takes place. If there are obstacles, the second layer calculates a new path and sends it to the third layer. The second layer refreshes at intervals, for example 50 milliseconds. Then the second layer recalculates and resends to the third layer. The local trajectory determined by the third layer also updates the set of vehicle control parameters for the second and first layers.

Implementation of the invention requires a processor adapted to perform the specific tasks of the three-layered system. For example, a processor is used for compute comparable to the Nvidia Drive PX2. In an alternative embodiment, the Nvidia Drive PX2 itself is used. The Nvidia Drive PX 2 relies one or two Tegra X2 SoCs (System on a Chip). Each SoC contains 2 Denver cores, 4 ARM A57 cores and a GPU from the Pascal generation.

In an embodiment, the invention is implemented in one device with components for handling each of the three layers. Alternatively, the invention may be implemented with more than one device. Exemplary embodiments include implementing the first layer with a mobile phone running a map application, such as Google maps. For the second layer, a single-core processor runs a real-time operating system (RTOS) or, alternatively, a non-real-time operating system). The MPC solver of the third layer can be run separately in an RTOS or non-RTOS.

Embodiments of the invention include linear and nonlinear optimization. Optimization selects a choice among possible choices that best fits a set of constraints. In an embodiment, the Python programming language is used to optimize parameters in a model that calculates optimal choices, such as paths, that can be described with variables and equations. For example, a generalized optimization problem can be stated as minimizing J(x), subject to conditions g(x)>0 and f(x)=0.

In an embodiment, the invention is implemented for a car following another car, for example, a car following another car on a racecourse where multiple laps are completed. The system chooses different options and analyzes the possible outcomes. Options are ranked and then used to make a conclusion model. In such an embodiment, the solutions for each lap may or may not be stored. In an embodiment, the solutions from previous laps are not stored, such that few system resources are used. The system looks for a fresh solution with each lap. Alternatively, in an embodiment the system compares the performance of previous laps to identify optimal routes and prefers new solutions that offer improvements over past solutions.

In an embodiment, the first layer calculation of the global path is made from a map where the car is localized. The initial trajectory is generated before the trip or, in the case of a racecourse, before the race.

Security features are optionally included. For example, at the second stage the system may be implemented to avoid obstacles or not. If the obstacle can't be avoided, then the emergency system will enable a new trajectory to minimize damage. Trajectories are ranked according to risk. The second layer graph sets parameters explicitly, including safety parameters.

Figure 2:
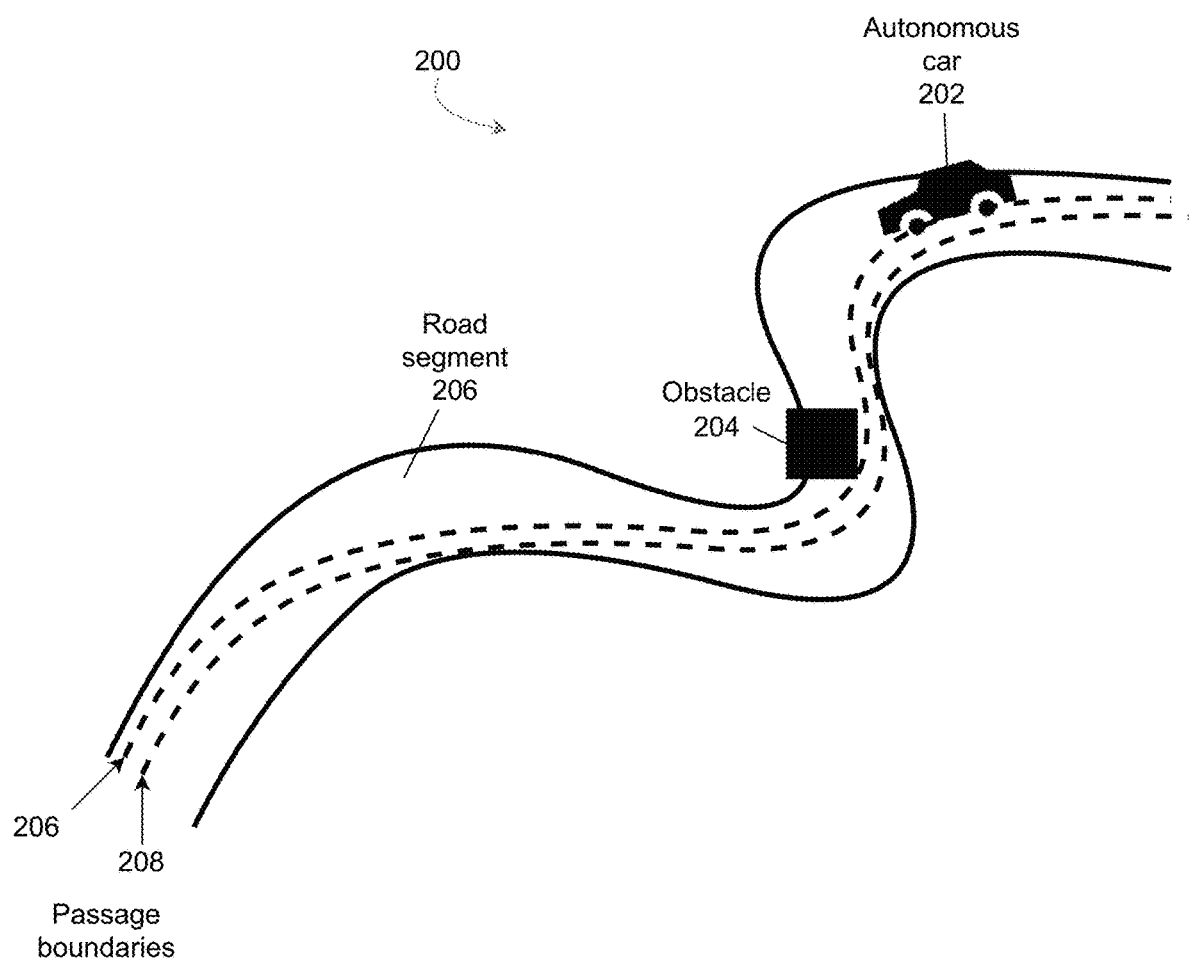
FIG. 2 shows an embodiment of a fast local planner.
Figure 3:
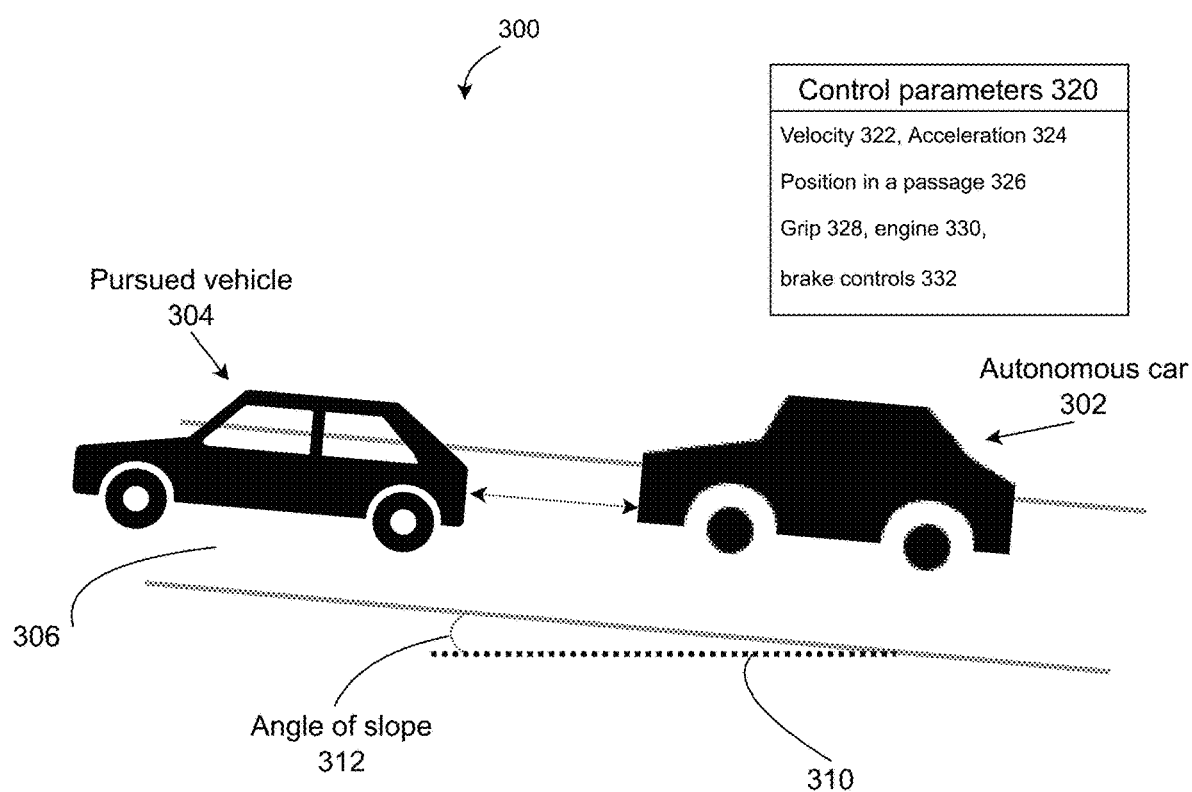
FIG. 3 shows an embodiment of a local planner with advanced vehicle dynamics.
Figure 4:
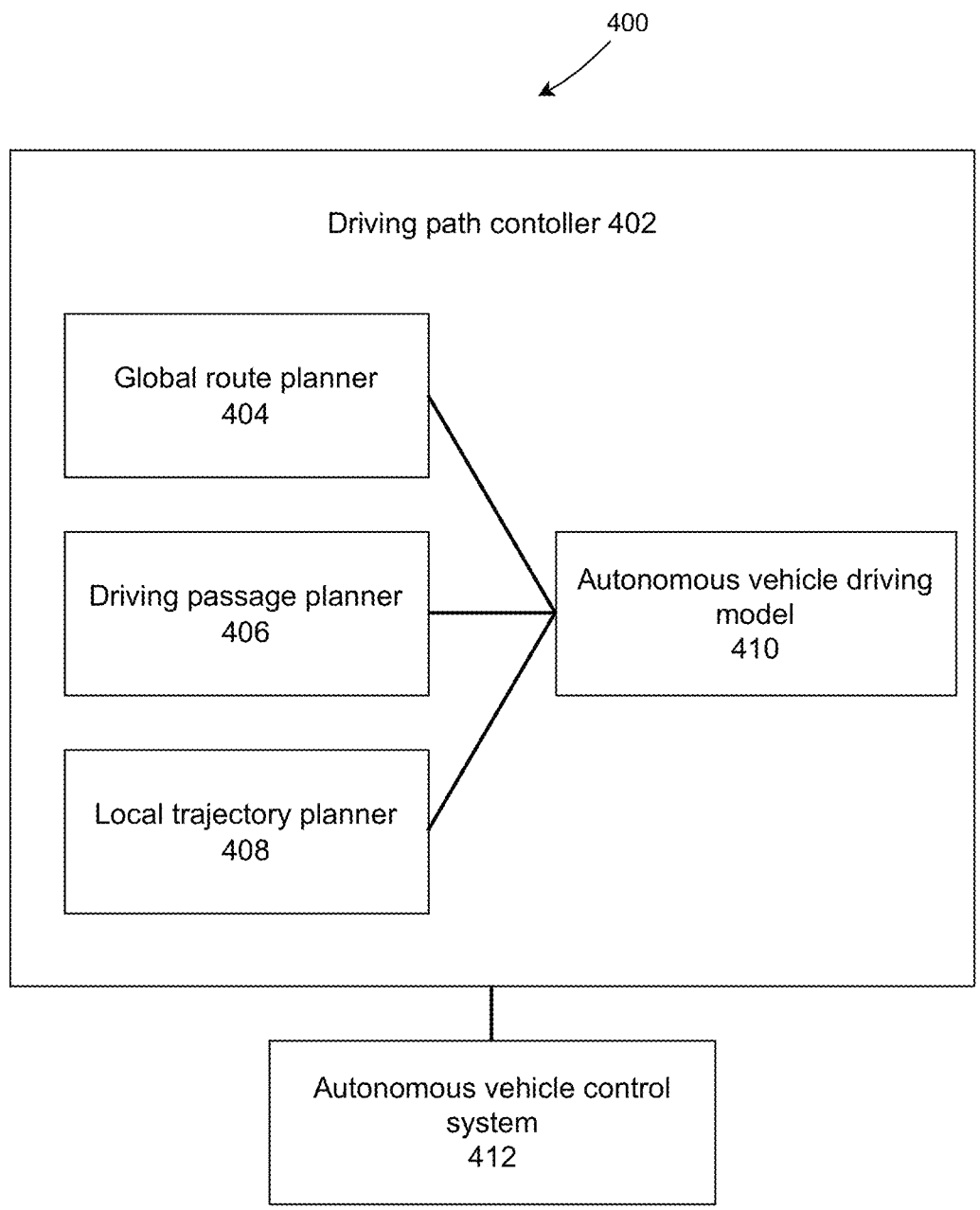
FIG. 4 shows a schematic view of a driving path controller.

FIGS. 1-3 show each of the three layers. FIG. 1 shows a global planning path 100 that includes a starting point 102, a path 104, and a destination 106. The generation of path 104 can be accomplished by a map-based application. Known obstacles along path 104 may be incorporated into its generation. FIG. 2 shows a fast local planner 200 where autonomous car 202 is faced with obstacle 204. The field of fast local planning 200 is road segment 206. Autonomous car 202 travels along road segment 206 between passage boundaries 206 and 208. FIG. 3 shows a local planner 300 with advanced vehicle dynamics. As shown in FIG. 3, autonomous car 302 pursues 304 on road segment 306. With respect to a hypothetical flat road segment 310, road segment 306 has an angle of slope 312. Control parameters for autonomous car 302 are also shown. Exemplary control parameters include velocity 322, acceleration 324, position in a passage of road 326, grip 328, engine 330, and brake controls 332. These control parameters are present FIG. 4 shows a schematic diagram 400 of a driving path controller 402 with three layers: a global route planner 404, driving passage planner 406, and local trajectory planner 408. These three layers generate an autonomous vehicle driving model 410, which is a component of autonomous vehicle control system 412.

Figure 5:
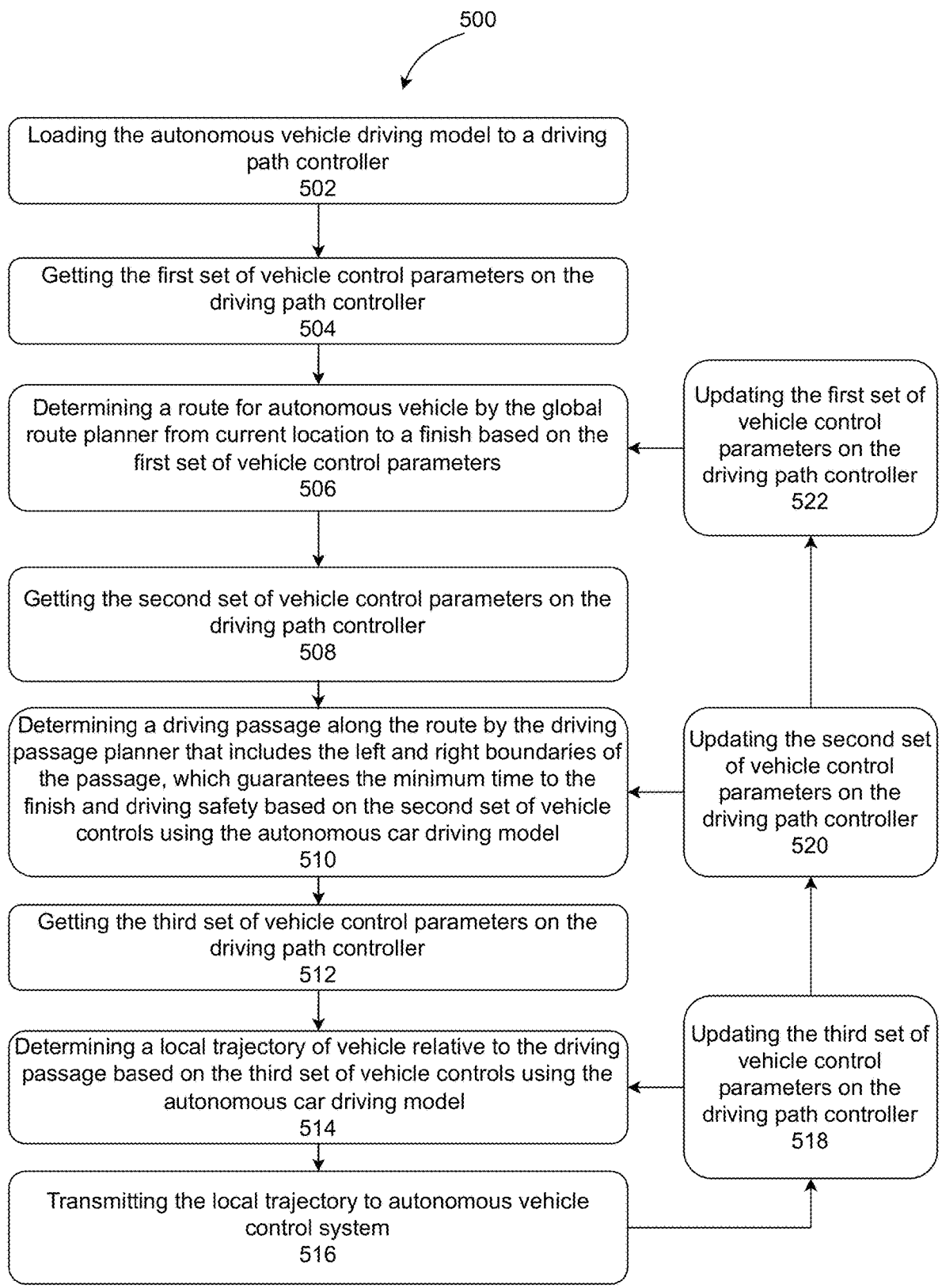
FIG. 5 shows a block diagram of steps comprising a method of multi-layered path planning and execution.

FIG. 5 shows a block diagram 500 of a method of multi-layered path planning and execution. At step 502, an autonomous vehicle driving model is loaded to a driving path controller. At step 504, a first set of vehicle control parameters are loaded on the driving path controller. A global route planner determines a route for an autonomous vehicle from a current location to a finish based on a first set of vehicle control parameters at step 506. Steps 502, 504, and 506 generally comprise the first layer. The second layer begins at step 508 when the driving path controller receives a second set of vehicle control parameters. The second layer proceeds at step 510 by determining a driving passage along the route by the driving passage planner that includes the left and right boundaries of the passage, which guarantees the minimum time to the finish and driving safety based on the second set of vehicle controls using the autonomous car driving model. The third layer begins at step 512 with getting a third set of vehicle control parameters on the driving path controller. Then a local trajectory of a vehicle is determined at step 514 relative to the driving passage. This determination is based on the third set of vehicle controls using the autonomous car driving model. The third layer proceeds by transmitting the local trajectory to an autonomous vehicle control system at step 516. The local trajectory is then used to update the third set of vehicle control parameters on the driving path controller at step 518, to update the second set of vehicle control parameters at step 520, and to update the first set of vehicle control parameters on the driving path controller 522.

Figure 6:
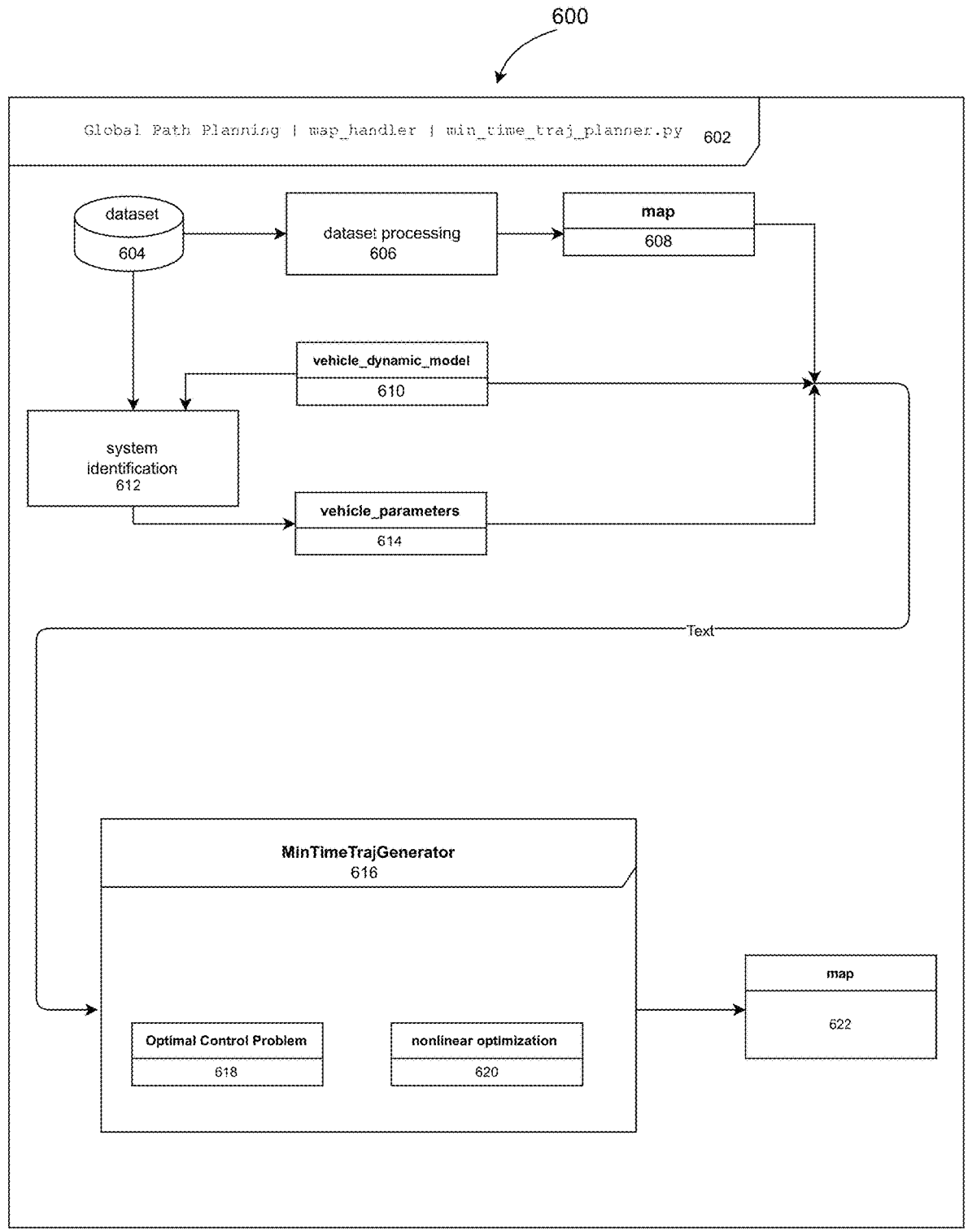
FIG. 6 shows an implementation of global path planning.

FIG. 6 shows an implementation 600 of the first layer, of global path planning 602, specifically global path planning using map handling to determine the quickest trajectory for an autonomous vehicle. Dataset 604 is processed at 606 to generate map 608. In an embodiment, dataset 604 comprises data collected by means of LIDAR, video, GPS, or Internal Measurement Units. In a further embodiment, first map 608 is generated from dataset 604, where the data is not related to vehicle parameters, for example, the map may be a representation of the track. Map 604 comprises, for example, an inside track bound, an outside track bound, and an estimated centerline. Vehicle dynamic model 610 includes, for example, a kinematic model, a single track dynamic model, and a two track dynamic model. vehicle dynamic model. This vehicle dynamic model 610 communicates with system identification 612, as does dataset 604. Vehicle parameters 614 include wheelbase front, wheelbase rear, track width front, track width rear, center of gravity, yaw inertia, and so on. Map 608, vehicle dynamic model 610 and vehicle parameters 614 are inputs for MinTimeTrajGenerator 616. MinTimeTrajGenerator 616 comprises an optimal control problem 618 and nonlinear optimization 620. Optimal control problem 618 comprises conditions such as controls to be used, lap time, penalties that could be assessed, and so on. Nonlinear optimization 620 calculates optimal values, such as optimal control to minimize costs, lap time, risks, actuation. Optimal values could also be expressed as maxima, such as velocity, acceleration, safest path, and so on. Nonlinear optimization is used to achieve better accuracy or granularity when analyzing discontinuous or complex functions.

The output of MinTimeTrajGenerator 616 is a second map 622. Second map 622 comprises, for example, an inside track bound, an outside track bound, and an estimated optimal centerline. Second map 622 further comprises values such as optimal velocity (Ux optimal acceleration (Vx) optimal time (t) optimal yaw rate (yaw rate), and so on.

Figure 7:
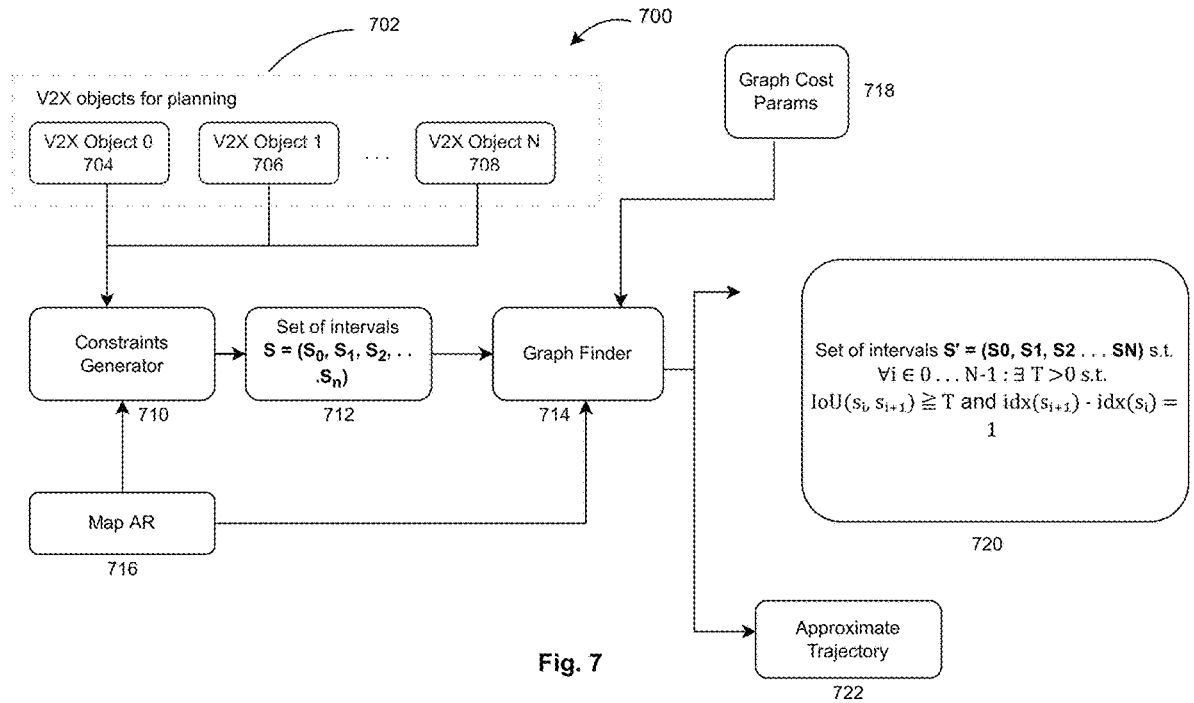
FIG. 7 shows an implementation of a fast local planner.

FIG. 7 shows an implementation of a fast local planner 700 comprising a set of 0 or more V2X objects 702 for planning. In an embodiment, these V2X objects include, for example, V2X objects 704, 706, and continue through V2X object 708. The case where the number of objects zero occurs when no obstacles are detected.

Constraints generator 710 generates a set of intervals 712, namely s={$s_0$, $s_1$, $s_2$, ... s?} that become input to graph finder 714. Another input for graph finder 714 is map AR 716. The graph finder's output is a set of intervals s'={$s_0$, $s_1$, $s_2$, ... s?} such that $\forall i \in 0 ... N-1: \exists T>0 such that IoU(s_i, s_{i+1}) \geq T$ and $idx(s_{i+1})-idx(s_i)=1$. IoU in this context refers to Intersection over Union, an evaluation metric used to measure the accuracy of an object detector on a particular dataset.

Figure 8:
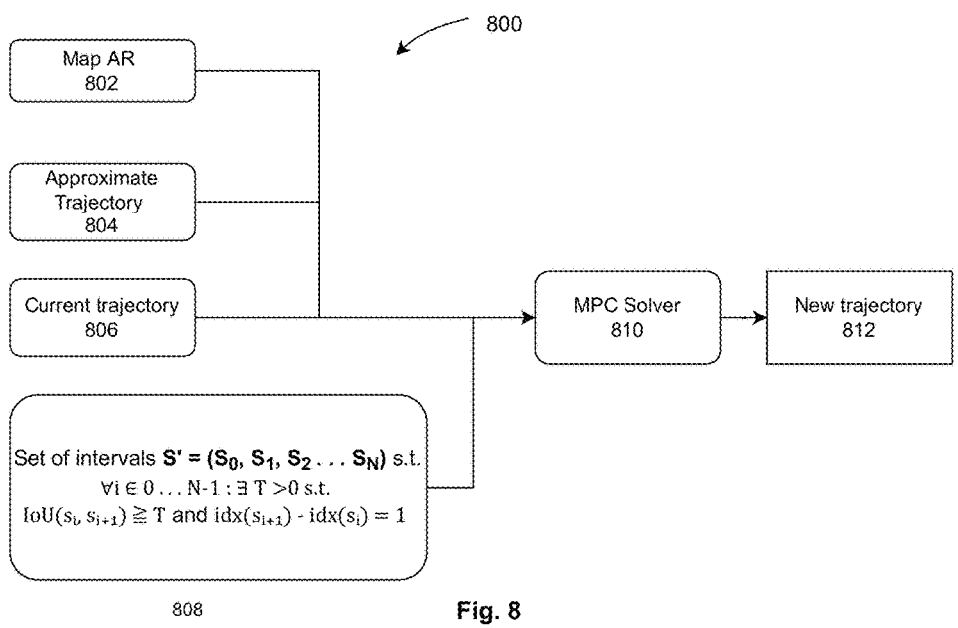
FIG. 8 shows an implementation of a local planner with advanced vehicle dynamics.

FIG. 8 shows an implementation of a local planner 800 with advanced vehicle dynamics. The inputs Map AR 802, approximate trajectory 804, current trajectory 806, and set of intervals 808 are inputs for MPC solver. For the second layer, the set of intervals 808 is obtained, namely s'={$s_0$, $s_1$, $s_2$, ... s?} so that $\forall i \in 0 ... N-1: \exists T>0 such that IoU(s_i, s_{i+1}) \geq T$ and $idx(s_{i+1})-idx(s_i)=1$. Another input from the second layer is approximate trajectory 804. In an embodiment, the MPC solver 810 of the third layer uses static parameters for the algorithms to generate new trajectory 812. Additional input is not required to generate new trajectory 812.

Embodiments described above show how the invention is implemented for vehicles traveling on a path that comprises a racetrack, on a path that comprises city or country streets. In either case, the path may be repeated, such as laps on a racecourse, or not repeated, or may be a combination of repeated and unique road segments.

In an embodiment, the hardware housing the drive path controller comprises a unit with embedded modules for three-tiered planning. Alternatively, one or more of the planning modules—global, fast local, and dynamic local—are housed in separate hardware. For example, one or more planners may be embedded in the autonomous vehicle's vehicle control system and communicate with any external module using a wireless network. In an embodiment, all three modules can be contained within the autonomous vehicle's vehicle control system.

Data collected for calculating trajectories can come from multiple sources. For example, the global path can be calculated based on GPS data, maps of the route known to be reliable, or a combination of both. The second control parameter data, which includes the vehicle's 3D model, speed and acceleration limits, curve limits, weight, and braking distance may be collected by lidar, radar, cameras, or IR sensors. Alternatively some or all of the second control parameter data can be collected from known values, whether measured before the trip or given by the vehicle's specifications. The third set of parameters, which includes road grip, torque, engine RPM, air resistance, brake efficiency, steering angle, driving path control, tire pressure, engine temperature, and energy consumption, can be collected and updated in real time or established before the trip using known values (tire pressure, brake efficiency, etc.) or based on the vehicle's specifications (torque, engine RPM, air resistance, etc.). In an embodiment, vehicle parameters are determined by both real-time data and known values.

To reduce computational overhead, each of the three planning tiers may use known values or values taken from vehicle specifications (if deemed reliable) to reduce either the total energy requirements of the system or the compute required. For example, the parameter vehicle weight can be taken from manufacturer's specifications and used in calculations without being continuously verified along the route. To speed up real-time calculations, sensor and compute resources are allocated first to data that has the greatest effect on vehicle trajectory and is likely to change along the route. In an embodiment, parameters that never or rarely change (e.g. vehicle weight) can be verified less frequently to reduce overhead and improve the speed of path calculation. Values that change more frequently depending on conditions, such as road grip, energy consumption, and brake efficiency, verified more frequently. Compute resources and sensors assigned to obstacle detection can also be weighted in favor of moving obstacles (e.g. other vehicles) compared to non-moving obstacles (traffic signs, cones, parked vehicles, etc.).

The invention claimed is:

1. A computer implemented method for planning a safe trajectory for an autonomous vehicle with a vehicle control system, the method for planning a safe trajectory of the autonomous vehicle executed on a driving path controller, the method comprising:
   loading the autonomous vehicle driving model to a driving path controller;
   reading a first set of vehicle control parameters on the driving path controller;
   determining a route for autonomous vehicle by the global route planner from current location to a finish based on the first set of vehicle control parameters;

periodically reading a second set of vehicle control parameters on the driving path controller;
determining a driving passage along the route by the driving passage planner that includes the left and right boundaries of the passage, which guarantees the minimum time to the finish and driving safety based on the second set of vehicle control parameters using the autonomous vehicle driving model;
periodically reading a third set of vehicle control parameters on the driving path controller;
determining a local trajectory of vehicle relative to the driving passage based on the third set of vehicle control parameters using the autonomous car driving model;
transmitting the local trajectory to the autonomous vehicle control system.

2. The method of claim 1, wherein the first set of vehicle control parameters includes static autonomous vehicle control parameters.

3. The method of claim 1, wherein the first set of vehicle control parameters comprises at least one of GPS and mobile positioning.

4. The method of claim 1, wherein the second set of vehicle control parameters includes parameters defining circumstances around the autonomous vehicle.

5. The method of claim 1, wherein the second set of vehicle control parameters comprises at least one of lidar, radar, cameras, and IR sensors.

6. The method of claim 1, wherein the third set of vehicle control parameters includes parameters of autonomous vehicle environment.

7. The method of claim 1, wherein the third set of vehicle control parameters comprises at least one of road grip, torque, engine RPM, air resistance, brake efficiency, steering angle, driving path control, tire pressure, engine temperature, and energy consumption.

8. The method of claim 1, wherein the period of reading the first set of vehicle control parameters is longer than the period of reading the third set of vehicle control parameters.

9. The method of claim 1, wherein the local trajectory can go beyond the boundaries of the passage if it leads to minimization of the time to finish.

10. The method of claim 1, wherein the local trajectory can go beyond the boundaries of the passage if it leads to better safety of the autonomous vehicle.

11. The method of claim 1, wherein the local trajectory can go beyond the boundaries of the passage if it leads to better performance of the autonomous vehicle.

12. A system for planning a safe trajectory for an autonomous vehicle with a vehicle control system, comprising:
a processor coupled with a nontransitory storage medium;
a global route planner, under program control of the processor, for determining a route for the autonomous vehicle from current location to a finish with a map data structure, based on a first set of vehicle control parameters;
a fast local planner, under program control of the processor, for determining a driving passage along the route by the based on a second set of vehicle control parameters according to a vehicle-to-everything infrastructure;
a dynamic local planner, under program control of the processor, for periodically reading a third set of vehicle control parameters on the driving path controller and determining a local trajectory for the autonomous vehicle relative to the driving passage based on the third set of vehicle control parameters; and
a transmitter for sending the local trajectory to the autonomous vehicle control system,
wherein at least one of the first set of vehicle control parameters, the second set of vehicle control parameters, or the third set of vehicle control parameters includes at least one known parameter and
wherein at least one of global route planner, the fast local planner, or the dynamic local planner allocates resources first to data that has the greatest effect on vehicle trajectory.

13. The system of claim 12, wherein the first set of vehicle control parameters comprises at least one of GPS and mobile positioning.

14. The method of claim 12, wherein the second set of vehicle control parameters includes parameters defining circumstances around the autonomous vehicle.

15. The method of claim 14, wherein the second set of vehicle control parameters comprises at least one of lidar, radar, cameras, and IR sensors.

16. The method of claim 12, wherein the third set of vehicle control parameters includes parameters of autonomous vehicle environment.

17. The method of claim 16, wherein the third set of vehicle control parameters comprises at least one of road grip, torque, engine RPM, air resistance, brake efficiency, steering angle, driving path control, tire pressure, engine temperature, and energy consumption.

18. A method for planning a safe trajectory for autonomous vehicle, the method for planning a safe trajectory of an autonomous vehicle executed on a driving path controller, the method comprising:
receiving a route calculated by a global trip planner under program control of a processor according to a map data structure and a calculated driving passage along the route prepared by a local planner under program control of the processor according to a vehicle-to-everything infrastructure;
periodically reading, under program control of the processor, a set of dynamic vehicle control parameters on the driving path controller;
determining, under program control of the processor, a local trajectory of vehicle relative to the driving passage based on the set of dynamic vehicle control parameters using the autonomous car driving model; and
transmitting the local trajectory to the autonomous vehicle control system,
wherein the set of dynamic vehicle control parameters includes at least one known parameter, and
wherein at least one of the periodically reading the set of dynamic vehicle control parameters or the determining the local trajectory allocates resources first to data that has the greatest effect on vehicle trajectory.

19. The method of claim 18, wherein the vehicle control parameters include at least one of road grip, torque, engine RPM, air resistance, brake efficiency, steering angle, driving path control, tire pressure, engine temperature, and energy consumption.

20. The method of claim 19, wherein the step of determining a local trajectory further comprises determining a path for overtaking another vehicle along the route.

* * * * *